Aug. 21, 1956   J. J. BARUCH   2,759,554
ACOUSTIC ABSORBER

Filed Aug. 4, 1952   4 Sheets-Sheet 1

INVENTOR.
JORDAN J. BARUCH
BY *Rines and Rines*
ATTORNEYS

Aug. 21, 1956  J. J. BARUCH  2,759,554
ACOUSTIC ABSORBER

Filed Aug. 4, 1952  4 Sheets-Sheet 2

*INVENTOR.*
JORDAN J. BARUCH
BY *Rines and Rines*
ATTORNEYS

Aug. 21, 1956  J. J. BARUCH  2,759,554
ACOUSTIC ABSORBER
Filed Aug. 4, 1952  4 Sheets-Sheet 3

*INVENTOR.*
JORDAN J. BARUCH
BY *Rines and Rines*
ATTORNEYS

Aug. 21, 1956  J. J. BARUCH  2,759,554
ACOUSTIC ABSORBER
Filed Aug. 4, 1952  4 Sheets-Sheet 4
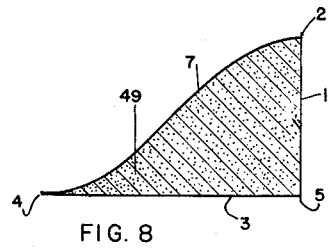
FIG. 8
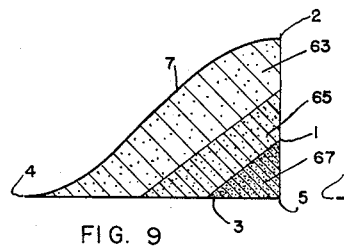
FIG. 9
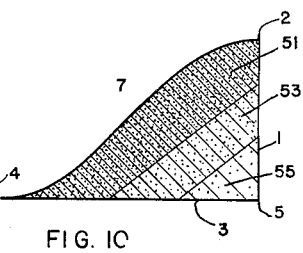
FIG. 10
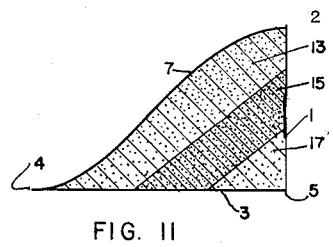
FIG. 11
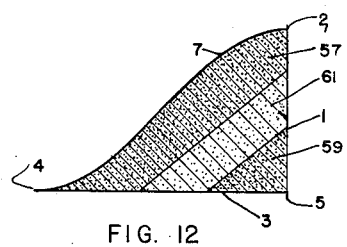
FIG. 12
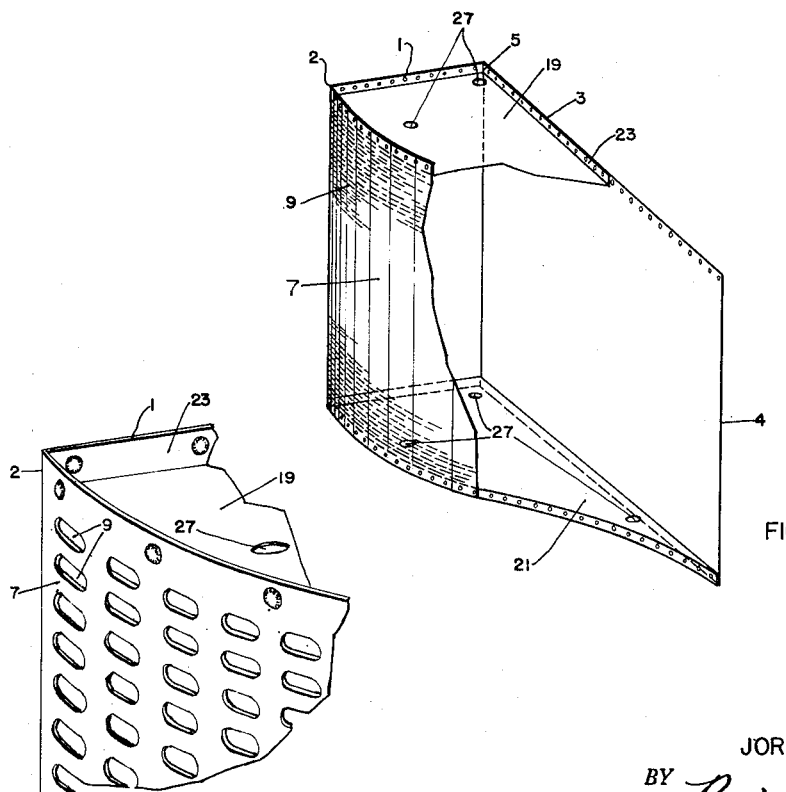
FIG. 13
FIG. 14
*INVENTOR.*
JORDAN J. BARUCH
BY *Rines and Rines*
ATTORNEYS

United States Patent Office 2,759,554
Patented Aug. 21, 1956

2,759,554

ACOUSTIC ABSORBER

Jordan J. Baruch, Cambridge, Mass., assignor, by mesne assignments, to Bolt Beranek and Newman Inc., Cambridge, Mass., a corporation of Massachusetts Application August 4, 1952, Serial No. 302,545

45 Claims. (Cl. 181—33)

The present invention relates to acoustic absorbers, and, more particularly, to devices for absorbing acoustic energy accompanying the flow of a fluid medium within a confined space.

In my copending application, Serial No. 302,544, filed of even date herewith, systems are discussed, such as aircraft test chambers, mufflers, air-conditioning plants, and the like, where it is desired to eliminate sounds accompanying the flow of a fluid medium, such as air, through a confined space. This result may be effected, as taught in my said application, with the aid of stream-lined absorbing devices appropriately placed within the confined space.

An object of the present invention is to provide a new and improved acoustic absorber particularly adapted for use in such a system, though of more general utility, as well.

Another object is to provide a basic acoustic absorber construction that lends itself to the convenient building of assemblies, arrays or stacks of such absorbers.

Still an additional object is to provide a new and improved assembly, array or stack of acoustic absorbers.

Other and further objects will be explained hereinafter and will be more particularly pointed out in the appended claims.

In summary, the present invention, from its broadest aspect, relates to a sound-absorbing device comprising an enclosure having one of its walls acoustically transparent to expose acoustically absorbent material and the remaining walls, acoustically opaque. Preferred wall configurations and constructional details for achieving the objects of invention are hereinafter discussed.

The invention will now be described in connection with the accompanying drawings, Fig. 1 of which is a perspective view of a sound-absorbing device constructed in accordance with a preferred embodiment of the present invention, with the top wall thereof removed and a portion of the plurality of sound-absorbing sections within the sound-absorbing device removed, in order to illustrate the constructional details of the device;

Figs. 8, 9, 10, 11 and 12 are plan views of the device of Fig. 1, as viewed with the top wall of the device removed, illustrating various modified arrangements of the density of sound-absorbing material within the device;

Fig. 13 is a perspective view, partly broken away, of a modification; and

Fig. 14 is an enlarged fragmentary view illustrating the preferred perforated metal wall construction of the device of Fig. 1.

Figure 1:
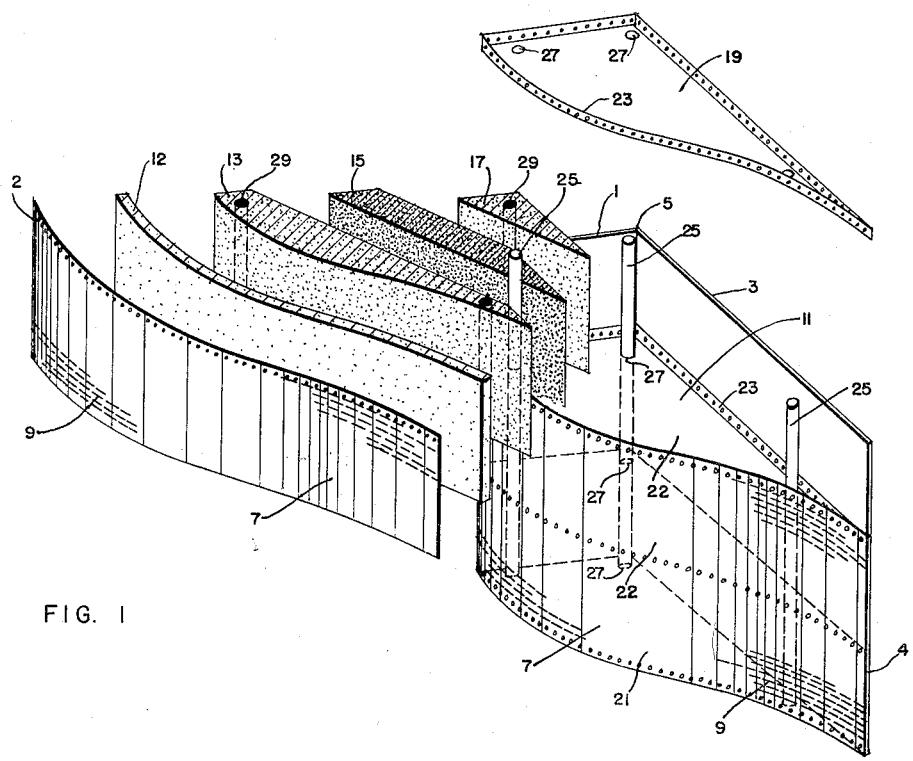

Referring first to Fig. 1, the sound-absorbing device is shown in the form of a basic prismatic quadrant or quarter-unit, having a pair of substantially planar acoustically opaque walls 1 and 3, joined in any desired manner substantially perpendicularly at 5. The walls 1 and 3 are connected by an acoustically transparent wall 7, the surface of which is a portion of a cylindrical surface and the upper third of which is shown removed to the left. The walls 1 and 3 may, for example, be constituted of sheet metal and the acoustically transparent wall 7 may be constituted of perforated metal, the perforations 9 of which are more clearly shown in Fig. 14. Other types of acoustically transparent material, such as wire mesh and the like, may also be used, but perforated metal is preferred because of its structural rigidity. The cylindrical wall 7 has opposite curvatures at its lines of connection 2 and 4 to the respective side walls 1 and 3 and has only one line of inflexion between the said lines of connection 2 and 4, for reasons hereinafter explained.

The substantially right-triangular enclosure 11 bounded by the walls 1, 3 and 7 is illustrated as substantially completely filled with acoustically absorbent material, such as fibre glass, packed felt, rock wool and the like. In accordance with the present invention, this acoustically-absorbent material is preferably in the form of separate sections shown at 12, 13, 15 and 17. Top and bottom walls 19 and 21 may also be provided for the enclosure, these walls 19 and 21 being recessed in order that the flanges 23 thereof may be easily riveted or otherwise secured to the walls 1, 3 and 7. In Fig. 1, the unit is shown divided into three sections of side walls 1 and 3 and of curved wall 7, each section being separated from the adjacent section by a separator wall 22 of the same character as the walls 19 and 21, the parts being similarly secured together. It is not necessary, however, though certain features of structural rigidity are thus obtained, that the sound-absorbing devices of the present invention be composed of three such sections. A single section comprising single uninterrupted walls 1 and 3, joined by a single uninterrupted curved wall 7 may also be utilized as shown in Fig. 13. The wall 7, moreover, has edges joining or connecting with each of the other walls 1, 3, 19 and 21 and defining a single closed curve representing the periphery of the wall 7.

Figure 2:
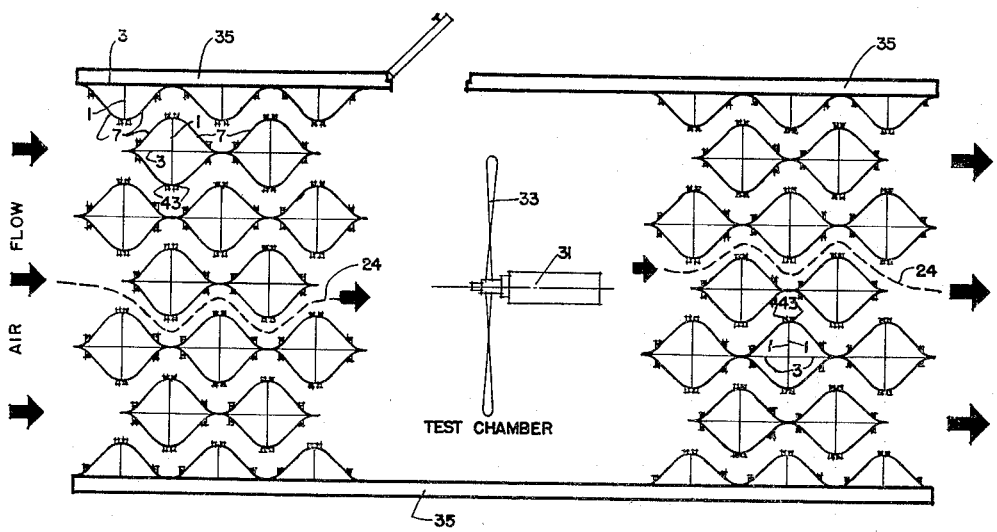
Fig. 2 is a plan view of an aircraft test chamber, with the roof removed, illustrating one application of arrays or assemblies of sound-absorbing devices of the character illustrated in Fig. 1.

This basic sound-absorbing device is particularly adapted for assembly into various sound-absorbing system configurations. In the system of Fig. 2, for example, an aerodynamic test chamber for testing the performance of an aircraft engine 31 driving a propeller 33, may contain terminal sections 35 embodying various arrays of assemblies of the sound-absorbing device of Fig. 1 for the purpose of reducing the intensity of audio-frequency sounds accompanying the flow of air from left to right, through the test chamber, in the direction of the arrows. As described in my said copending application, if zig-zag paths of the character illustrated at 24 in Fig. 2 are provided for the air flow, some sound absorption takes place along the walls of such paths, and by appropriately dimensioning the spacing of the crests of the paths and the transverse dimensions of the sound-absorbing devices, the intensity of the band of noise frequencies generated in the test cell may be satisfactorily reduced. The present invention discloses a preferred sound-absorbing device adapted to effect this result. In the system of Fig. 2, two types of assemblies of quadrant units of the character illustrated in Fig. 1 are shown. There are shown, first, assemblies of two units disposed along the sides of the test chamber at the top and bottom of Fig. 2. An enlarged view of the pairs of assembled devices along the walls of the chamber is presented in Fig. 5. Assemblies of four such quadrant devices, secondly, are shown intermediate the sides of the test chamber. Enlarged views of such assemblies of four units are presented in Figs. 3 and 4.

Figure 5:
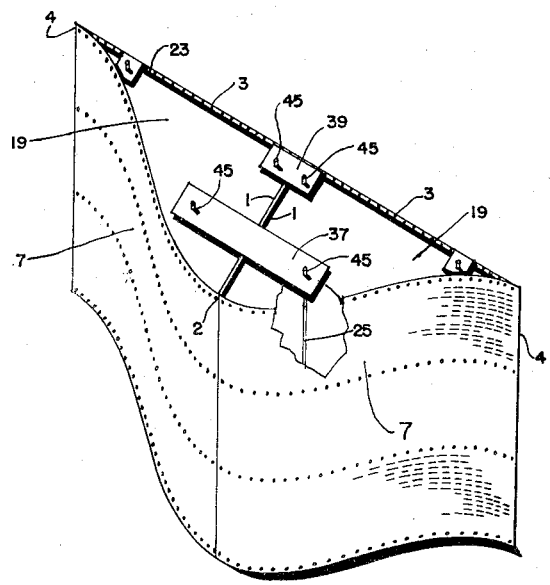
Fig. 5 is a view similar to Fig. 4 of one-half of the assembly of Fig. 4.
Figure 6:
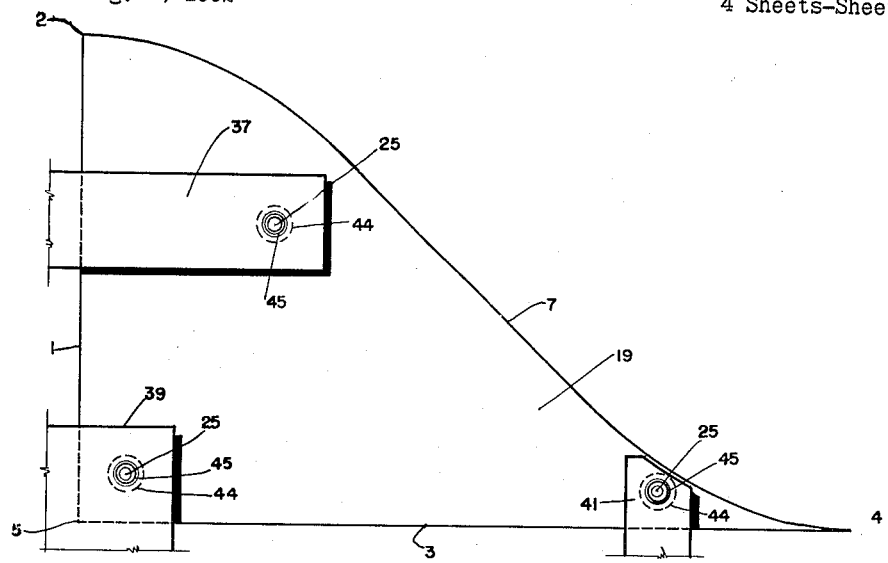
Fig. 6 is a section, upon a greatly enlarged scale, taken upon the line 6—6 of Fig. 3, looking in the direction of the arrows.

The securing of the units together in such assemblies is illustrated as effected with the aid of rods 25 that may be passed through holes 29, Fig. 1, in the sound-absorbing material of the units and through openings 27 in the top and bottom walls 19, 21 and in the separator walls 22, if used. One rod 25 is shown disposed near the junction of the walls 1 and 3, another rod 25 near the junction of the wall 1 and the curved wall 7, and a third rod 25 near the junction of the curved wall 7 and the wall 3. The shorter side walls 1 of two of the units may be secured together by locking plates 37 and 39, Fig. 5, having bushings 45, Fig. 6, for receiving the ends of the corresponding rods 25 disposed near the junction of the walls 1 and 7 and the walls 1 and 3 of the adjacent devices. The other walls 3 of the units are then alined in substantially the same plane and the pair of units is now provided with an acoustically transparent substantially U-shaped surface having symmetrically disposed walls 7, 7 inclining toward each other and meeting along a curve at the plane of symmetry formed by the joined walls 1. The free ends of this composite acoustically transparent wall are reversedly curved.

Figure 3:
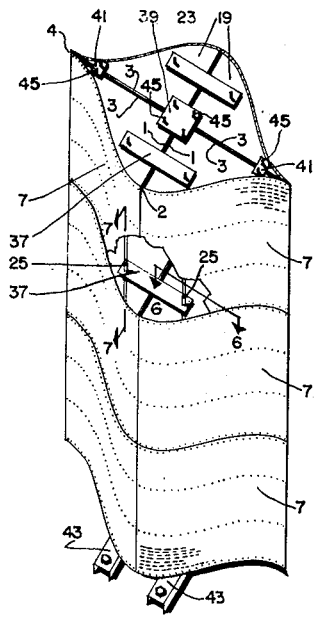
Fig. 3 is a perspective view of a vertically stacked array of assemblies of the said sound-absorbing devices adapted for use in the system of Fig. 2.
Figure 4:
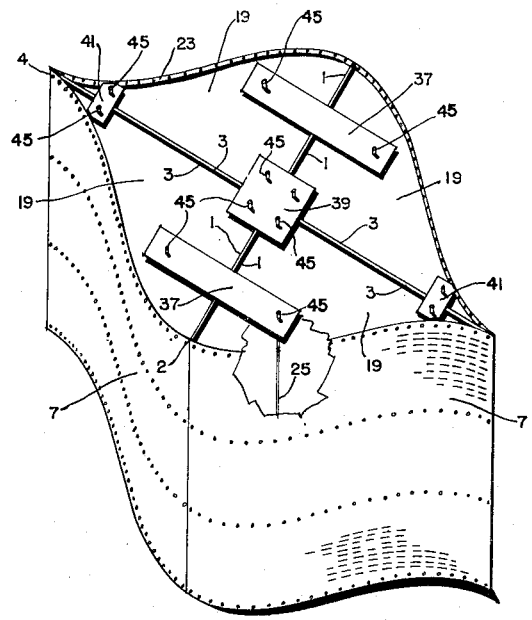
Fig. 4 is an enlarged perspective view of one of the assemblies of the array of Fig. 3.

The assembly of four units, or a pair of such two-unit substantially U-shaped assemblies, is effected with the aid of a somewhat larger centrally disposed locking plate 39, Figs. 3 and 4, and an additional locking plate 41 at the extremities of the device. The rods 25 of each of the four units disposed adjacent the junction of the walls 1 and 3 of the units are secured in four bushings 45 disposed near the four corners of the central locking plate 39. The rods 25 near the junction of the walls 3 and 7 of oppositely positioned devices are similarly received in bushings 45 in the further locking plates 41. The co-planar walls 3 of each of the pairs of units are thus juxtaposed, and the joined walls 1 of each pair of units are disposed in-line at right angles to the plane of the co-planar walls 3.

Figure 7:
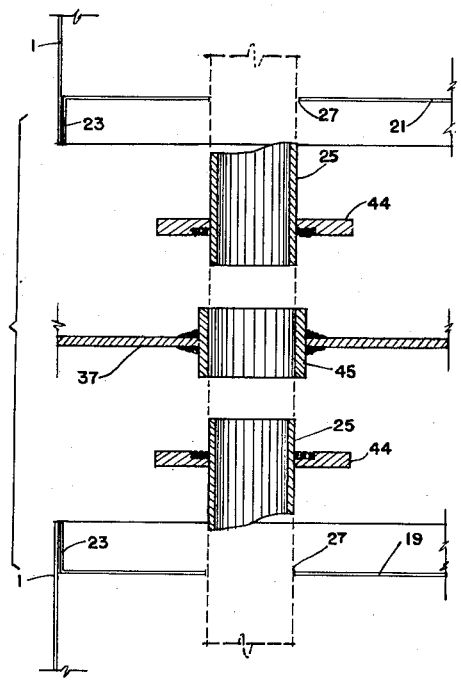
Fig. 7 is a section, upon still a larger scale, taken upon the line 7—7 of Fig. 3, looking in the direction of the arrows, with the parts shown separated to illustrate assembly details.

In the system of Fig. 2, however, the sound-absorbing devices must extend from the floor of the test cell to the roof. This could be accomplished by making the units of Fig. 1 of very tall dimensions. It is preferred, however, to keep these basic units of relatively small size, and to stack the assemblies of units, one upon another, thereby to fill the desired space. The before-mentioned locking plates 37, 39 and 41 assist in securing such a stacked array of assemblies of units. One assembly may be secured to beams 43 mounted upon the floor of the test chamber. A second assembly of units may be stacked thereupon, the second assembly receiving, in turn, a third assembly, and so on until the desired space is filled. The details of this stacking are more clearly shown in Fig. 7 in connection with the locking plate 37, it being understood that the same construction applies, also, to the other locking plates. Not only will the bushing 45 of the locking plate 37 receive the top of the securing rod 25 of the lower unit, but it is of sufficient length to receive, also, the bottom of the corresponding securing rod 25 of the next higher unit. Stops 44 may be provided to control the degree of insertion of the rods 25 into the bushing 45. The over-all distance between the stop 44 of the upper-unit rod 25 and the stop 44 of the lower-unit rod 25, when assembled in the bushing 45 of the locking plate 37, is adjusted to correspond to the length of the flange 23 of the recessed top wall 19 of the lower unit and of the bottom wall 21 of the upper unit. The unit-connecting construction is thus completely hidden within the top- and bottom-wall recesses and the top edges of the lower-unit acoustically transparent wall 7 will contact the bottom edges of the upper-unit acoustically transparent wall 7, providing a continuous wall, as shown in Fig. 3.

The before-described symmetrical, smooth-curved single-inflexion character of the acoustically transparent walls 7 will stream-line the flow of air passing through the test chamber. This design, however, will also permit the sound carried by the air to penetrate the walls 7 and become absorbed in the sound-absorbing medium within. With the array illustrated in Fig. 2, the largest transverse dimension of each longitudinal row of sound-absorbing devices is placed opposite the smallest transverse dimension of the adjacent row or rows of devices to provide successively converging and diverging adjacent zig-zag paths for the travel of the air. Other types of path configuration could also be employed for other purposes. As explained in my said copending application, and as before mentioned, since the higher frequencies tend to travel along straight lines, they become attenuated by the zig-zag paths. The intermediate frequencies and some of the lower frequencies are further attenuated by absorption along the walls of the devices, and they are still further attenuated as a result of proper longitudinal positioning of the crests of the zig-zag paths at 2, and of the transverse dimensioning of the walls 1 with respect to the half-wavelengths involved.

As also disclosed in my said copending application, different distributions of density of the sound-absorbing material within the units may produce different characteristics in the absorption of the sound frequencies. In Fig. 1, there is shown provided an S-shaped sound-absorbing section 12 of predetermined density, corresponding in curvature to that of the wall 7, a further curved section 13 of slightly increased sound-absorbing density, a substantially trapezoidal section 15 of still further increased density, and a substantially triangular section 17 of less density corresponding to that of the section 13. This distribution is similar to that shown in Fig. 11, the density of the sound-absorbing material being greater intermediate the enclosure 11, as at 15, than at the section 13 of the enclosure adjacent the curved wall 7 and at the central section 17 adjacent the connected ends 5 of the walls 1 and 3. In addition to their mechanical features, the perpendicular walls 1 serve not only to prevent the possibility of continuous travel of high-intensity sound energy through the complete sound-absorbing unit, but, also, to provide a sharp diffraction edge to the sound waves that insures the presence of a large amount of energy for absorption between successive crests of, for example, the array of units in Fig. 2. As stated in my said copending application, such a distribution has been found to provide excellent attenuation, in excess of 60 decibels, of the high audio frequencies above about 600 cycles per second, and very good attenuation of from about 40 to about 65 decibels, for intermediate frequencies in the range from about 100 cycles up to about 500 cycles. As is also explained in my said copending application, however, somewhat greater attenuation of the higher frequencies and less attenuation of the intermediate frequencies can be achieved with the aid of a substantially uniform density of sound-absorbing material as illustrated at 49 in Fig. 8. If somewhat greater attenuation of the lower frequencies, say in the neighborhood of 60 to 100 cycles is desired, than may be produced with the distribution of Fig. 8, with, however, substantially the same intermediate-frequency attenuation, a distribution of density of sound-absorbing material of the character shown in Fig. 10 may be employed, with the greatest density appearing in the section 51 adjacent the curved wall 7, and successively less dense sections at 53 and 55. If, on the other hand, much greater attenuation of the low and intermediate frequencies is desired than is produced by the distribution of Fig. 10, a distribution of density of the sound-absorbing material sections as shown in Fig. 12 may be employed with the sections 57 and 59, respectively disposed adjacent the curved wall 7 and the junction 5 of the plane walls 1 and 3, of greater density than the density of the intermediate section 61. If the attenuation characteristic produced by this distribution is to be modified, as still a further illustration, by reducing, somewhat, the attenuation of the low and the lower intermediate frequencies of the order of, say, 100 to 200 cycles, while improving the attenuation to the higher frequencies in excess of about 600 cycles, then the distribution of Fig. 9 may be employed in which the density of the sound-absorbing material successively increases from a less dense section 63 adjacent the curved wall 7, to a more dense section 65, to a still denser section 67 adjacent the junction 5 of the walls 1 and 3.

By utilizing these strips or sections of sound-absorbing material, therefore, the desired density gradations may be easily effected in accordance with the present invention for producing different desired attenuation characteristics. The described preferred unit construction, moreover, greatly reduces shipping and packing space. Erection problems, as before explained, are quite simple, and assemblies or arrays of devices may be easily put together in any desired grouping.

The structure of the present invention is not limited, of course, to use in a test chamber as shown in Fig. 2; but, on the contrary, it is equally adaptable for the construction of sound-absorbing devices for use in any confined spaces through which may flow a fluid medium, accompanied by sound that it is desired to reduce in intensity. Other applications, for example, are in the before-mentioned mufflers and in conduits such as those of air-conditioning systems. While the curved surfaces 7 are of the preferably substantially sine-wave shape, providing mechanical construction and assembly convenience consistent with proper streamlining and acoustic-absorbing properties, other preferably symmetrical smooth contours may also be utilized. The present invention, indeed, is adapted to the formation of different shapes of absorbing devices for a wide variety of other uses.

Further modifications will occur to those skilled in the art, and all such are considered to fall within the spirit and scope of the invention as defined in the appended claims.

What is claimed is:

1. A sound-absorbing device comprising a substantially triangular enclosure substantially completely filled with acoustically absorbent material, one of the walls of the enclosure being acoustically transparent and the remaining walls being acoustically opaque, the line formed by the junctions of the edges of the said one acoustically transparent wall with the adjacent acoustically opaque walls describing a single closed curve.

2. A sound-absorbing device comprising an enclosure substantially completely filled with acoustically absorbent material, one only of the walls of the enclosure being curved and acoustically transparent and the remaining walls being acoustically opaque, the line formed by the junctions of the edges of the said one acoustically transparent wall with the adjacent acoustically opaque walls describing a single closed curve.

3. A sound-absorbing device comprising an enclosure having two substantially plane side walls perpendicularly joined at one end and connected between their free ends by an acoustically transparent side wall and substantially plane upper and lower walls, the enclosure being substantially completely filled with acoustically absorbent material.

4. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material.

5. A sound-absorbing device comprising an enclosure having two perpendicularly joined substantially plane side walls connected by an acoustically transparent cylindrical wall having opposite curvatures at its lines of connection to the side walls, and having only one line of inflexion between the said lines of connection, the enclosure being substantially completely filled with acoustically absorbent material.

6. A sound-absorbing device comprising an enclosure having two perpendicularly joined substantially plane side walls connected by an acoustically transparent cylindrical wall having opposite curvatures at its lines of connection to the side walls and having only one line of inflexion between the said lines of connection, and substantially plane upper and lower walls, the enclosure being substantially completely filled with acoustically absorbent material.

7. A sound-absorbing device comprising an enclosure having two perpendicularly joined substantially plane side walls of unequal length connected by an acoustically transparent cylindrical wall having opposite curvatures at its lines of connection to the side walls and having only one line of inflexion between the said lines of connection, the curvature at the line of connection with the shorter plane wall being less than that at the line of connection with the longer plane wall, and substantially plane upper and lower walls, the enclosure being substantially completely filled with acoustically absorbent material.

8. A sound-absorbing device comprising an enclosure having two perpendicularly joined plane metal side walls connected by a perforated metal cylindrical wall having opposite curvatures at its lines of connection to the side walls and having only one line of inflexion between the said lines of connection, and substantially plane metal upper and lower walls, the enclosure being substantially completely filled with successive sections of acoustically absorbent material.

9. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material of substantially uniform sound-absorbing density.

10. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material of varying sound-absorbing density.

11. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material the sound-absorbing density of which increases from the cylindrical wall toward the junction of the two side walls.

12. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material the sound-absorbing density of which decreases from the cylindrical wall toward the junction of the two side walls.

13. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material the sound-absorbing density of which is greatest intermediate the enclosure.

14. A sound-absorbing device comprising an enclosure having two perpendicularly joined substantially plane side walls connected by an acoustically transparent cylindrical wall having opposite curvatures at its lines of connection to the side walls, the enclosure being substantially completely filled with acoustically absorbent material the sound-absorbing density of which is smallest intermediate the enclosure.

15. A sound-absorbing device comprising an enclosure having two perpendicularly joined plane metal side walls connected by a perforated metal cylindrical wall having opposite curvatures at its lines of connection to the side walls and having only one line of inflexion between the said lines of connection, and substantially plane metal upper and lower walls, the enclosure being substantially completely filled with successive sections of acoustically absorbent material having, respectively, contours of substantially the curvature of the cylindrical wall, of substantially trapezoidal shape and of substantially triangular shape.

16. A sound-absorbing device comprising an enclosure having a substantially plane side wall the oppositely disposed edges of which on each side of a plane of symmetry perpendicularly bisecting the side wall are connected by an acoustically transparent cylindrical wall substantially symmetrically disposed with respect to the said plane of symmetry, the enclosure being filled with sound-absorbing material.

17. A sound-absorbing device comprising an enclosure having a substantially plane side wall, an acoustically transparent surface having symmetrically disposed walls inclining toward each other and meeting along a curve at the plane of symmetry and the free ends of which are reversely curved and secured to oppositely disposed edges of the side wall, the enclosure being filled with sound-absorbing material.

18. A sound-absorbing device comprising an enclosure bounded by a pair of oppositely disposed similar acoustically transparent surfaces, each surface having symmetrically disposed walls inclining toward each other and meeting along a curve at the plane of symmetry and the free ends of which are reversely curved and secured to the free ends of the other surface, the enclosure being filled with sound-absorbing material.

19. A sound-absorbing member comprising a pair of similar sound-absorbing devices each comprising an enclosure having two perpendicularly joined substantially plane side walls connected by an acoustically transparent cylindrical wall having opposite curvatures at its lines of connection to the side walls and having only one line of inflexion between the said lines of connection, each enclosure being substantially completely filled with acoustically absorbent material, one of the side walls of one device being in juxtaposition with the corresponding side wall of the other device in order that the other side walls of the devices may lie in the same plane and the cylindrical walls may form an acoustically transparent curved surface symmetrical with respect to the said juxtaposed side walls.

20. A sound-absorbing device comprising an enclosure bounded by a pair of oppositely disposed similar acoustically transparent surfaces, each surface having symmetrically disposed walls inclining toward each other and meeting along a curve at the plane of symmetry and the free ends of which are reversely curved and secured to the free ends of the other surface, the enclosure being filled with sound-absorbing material, and means for securing together the said walls comprising rods passing through the enclosures of each device and a locking plate having apertures for receiving the rods.

21. A sound-absorbing member comprising first and second pairs of similar sound-absorbing devices, each device comprising an enclosure having two perpendicularly joined substantially plane side walls connected by an acoustically transparent cylindrical wall having opposite curvatures at its lines of connection to the side walls and having only one line of inflexion between the said lines of connection, each enclosure being substantially completely filled with acoustically absorbent material, one of the side walls of one device of each pair of devices being in juxtaposition with the corresponding side wall of the other device of the said pair of devices in order that the other side walls of the devices of each pair of devices may lie in the same plane and the cylindrical walls thereof may form an acoustically transparent curved surface symmetrical with respect to the said juxtaposed side walls, the said other side walls of the pair of devices being symmetrically juxtaposed so that their planes substantially coincide.

22. A plurality of sound-absorbing devices each comprising an enclosure having a substantially plane side wall, an acoustically transparent surface having symmetrically disposed walls inclining toward each other and meeting along a curve at the plane of symmetry and the free ends of which are reversely curved and secured to the oppositely disposed edges of the side wall, the enclosure being filled with sound-absorbing material, the devices being stacked one upon another.

23. A plurality of sound-absorbing devices each comprising an enclosure having a substantially plane side wall, an acoustically transparent surface having symmetrically disposed walls inclining toward each other and meeting along a curve at the plane of symmetry and the free ends of which are reversely curved and secured to the oppositely disposed edges of the side wall, the enclosure being filled with sound-absorbing material, the devices being stacked one upon another, a plurality of rods extending through the stacked devices, and locking-plate means having apertures for receiving the rods of adjacent stacked devices to lock the same together.

24. A plurality of sound-absorbing devices of the character described in claim 23 and in which recessed upper and lower planar walls are provided for each device in order that the locking-plate means may be received within the recesses of adjacent devices, thereby to provide the contact between top and bottom edges of the acoustically transparent walls of adjacent stacked devices.

25. A sound-absorbing device for use in a fluid medium comprising a housing the space contained within the walls of which is substantially completely filled with acoustically absorbent material, one of the walls of the housing being acoustically transparent and the remaining walls being acoustically opaque, the said one acoustically transparent wall being connected along its edges to each of the other walls of the housing.

26. A sound-absorbing device comprising an enclosure bounded by a pair of oppositely disposed similar acoustically transparent surfaces, each surface having symmetrically disposed walls inclining toward each other and meeting along a curve at the plane of symmetry and the free ends of which are reversely curved and secured to the free ends of the other surface, the enclosure being filled with sound-absorbing material, and means for securing together the said symmetrical walls.

27. A plurality of sound-absorbing devices each comprising an enclosure having a substantially plane side wall, an acoustically transparent surface having symmetrically disposed walls inclining toward each other and and meeting along a curve at the plane of symmetry and the free ends of which are reversely curved and secured to the oppositely disposed edges of the side wall, the enclosure being filled with sound-absorbing material, the devices being stacked one upon another, and means for securing the devices in stacked relation.

28. A plurality of sound-absorbing devices of the character described in claim 27 and in which recessed upper and lower planar walls are provided for each device in order to provide contact between top and bottom edges of the acoustically transparent walls of adjacent stacked devices.

29. A sound-absorbing device for use in a fluid medium comprising a substantially prismatic housing of substantially right-triangular cross-section the space contained within the walls of which is substantially completely filled with acoustically absorbent material, one of the walls of the housing constituting the hypotenuse of the substantially right triangle and being connected along its edges to each of the other walls of the housing, the said one wall being acoustically transparent and the remaining walls being acoustically opaque.

30. A sound-absorbing device for use in a fluid medium comprising a substantially prismatic housing of substantially right-triangular cross-section the space contained within the walls of which is substantially completely filled with acoustically absorbent material, one of the walls of the housing constituting the hypotenuse of the substantially right triangle but being curved outward with only a single line of inflexion and with its edges connected to each of the other walls of the housing, the said one wall being acoustically transparent and the remaining walls being acoustically opaque.

31. A sound-absorbing member comprising a pair of similar sound-absorbing devices each comprising a substantially prismatic housing of substantially right-triangular cross-section the space contained within the walls of which is substantially completely filled with acoustically absorbent material, one of the walls of each housing constituting the hypotenuse of the substantially right triangle but being curved outward with only a single line of inflexion and with its edges connected to each of the other walls of the housing, the said one wall being acoustically transparent and the remaining walls being acoustically opaque, and means for disposing the pair of sound-absorbing devices in juxtaposition with the acoustically transparent walls forming a single smooth symmetrical curved surface.

32. A sound-absorbing device comprising an enclosure having an acoustically opaque plane wall, an acoustically transparent surface having symmetrically disposed walls inclining toward each other and meeting along a curve at the plane of symmetry and the free ends of which are reversedly curved and secured to oppositely disposed edges of the plane wall, a further acoustically opaque wall disposed in the said plane of symmetry bisecting the first-named plane wall at right angles, the enclosure being filled with sound-absorbing material on both sides of the said plane of symmetry.

33. A sound-absorbing device comprising an enclosure substantially completely filled with acoustically absorbent material one of the walls of the enclosure being acoustically transparent and the remaining walls being acoustically opaque, the transverse dimension of the enclosure from the acoustically transparent wall through the absorbent material to one of the other walls varying gradually from one side of the enclosure to the other.

34. A sound-absorbing device comprising an enclosure substantially completely filled with acoustically absorbent material one of the walls of the enclosure being acoustically transparent and the remaining walls being acoustically opaque, the transverse dimension of the enclosure from the acoustically transparent wall through the absorbent material to one of the other walls increasing and decreasing symmetrically between the sides of the enclosure.

35. A sound-absorbing device comprising an acoustically absorbent enclosure bounded by a pair of similar substantially U-shaped walls at least in part acoustically transparent and disposed with the necks of the U's facing each other and the arms of the U's joined at their free ends.

36. A sound-absorbing device comprising an acoustically absorbent enclosure bounded by a pair of similar substantially U-shaped walls at least in part acoustically transparent and disposed with the necks of the U's facing each other and the arms of the U's joined at their free ends, the enclosure having an acoustically opaque wall dividing it into acoustically absorbent sections.

37. A sound-absorbing device comprising an acoustically absorbent enclosure bounded by a pair of similar substantially U-shaped walls the free ends of the arms of which are reversedly curved and joined together with the necks of the U's facing each other, the bounding walls having openings for permitting the passage into the enclosure of acoustic energy.

38. A sound-absorbing device comprising an acoustically absorbent enclosure bounded by a pair of similar substantially U-shaped walls the free ends of the arms of which are reversedly curved and joined together with the necks of the U's facing each other, the bounding walls having openings for permitting the passage into the enclosure of acoustic energy and the enclosure having an acoustically opaque wall dividing it into acoustically absorbent sections.

39. A plurality of sound-absorbing devices each comprising an acoustically absorbent enclosure bounded by a pair of similar substantially U-shaped walls the free ends of the arms of which are reversedly curved and joined together with the necks of the U's facing each other, the bounding walls having openings for permitting the passage into the enclosure of acoustic energy, the devices being stacked one upon another, and means for securing the devices in stacked relation.

40. A sound-absorbing device for use in a fluid medium comprising a substantially prismatic housing of substantially right-triangular cross-section the space contained within the walls of which is acoustically absorbent, one of the walls of the housing constituting the hypotenuse of the substantially right triangle and being connected along its edges to each of the other walls of the housing, the said one wall having opening means for permitting the passage of acoustic energy into the said space and the remaining walls being acoustically opaque.

41. A sound-absorbing device comprising an acoustically absorbent enclosure having an acoustically opaque plane wall, a surface having opening means for permitting the passage of acoustic energy into the said enclosure and having symmetrically disposed walls inclining toward each other and meeting along a curve at the plane of symmetry and the free ends of which are reversedly curved and secured to oppositely disposed edges of the plane wall, and a further acoustically opaque wall disposed in the said plane of symmetry bisecting the first-named plane wall at right angles.

42. A sound-absorbing device for use in a fluid medium comprising a substantially prismatic housing of substantially right-triangular cross-section, one of the walls of the housing constituting the hypotenuse of the substantially right triangle and being connected along its edges to each of the other walls of the housing, the said one wall exposing acoustically absorbent material to acoustic energy accompanying the flow of the said fluid medium and the remaining walls being acoustically opaque.

43. A sound-absorbing device for use in a fluid medium comprising a substantially prismatic housing of substantially right-triangular cross-section, one of the walls of the housing constituting the hypotenuse of the substantially right triangle but being curved outwardly with only a single line of inflexion and with its edges connected to each of the other walls of the housing, the said one wall exposing acoustically absorbent material to acoustic energy accompanying the flow of the said fluid medium and the remaining walls being acoustically opaque.

44. A sound-absorbing device comprising an enclosure having an acoustically opaque plane wall, a surface exposing acoustically absorbent material to acoustic energy having symmetrically disposed walls inclining toward each other and meeting along a curve at the plane of symmetry and the free ends of which are reversedly curved and secured to oppositely disposed edges of the plane wall, and a further acoustically opaque wall disposed within the enclosure to divide the enclosure into a pair of acoustically absorbent chambers.

45. A sound-absorbing device comprising an enclosure bounded by a pair of similar substantially U-shaped walls the free ends of the arms of which are reversedly curved and joined together with the necks of the U's facing each other, the bounding walls exposing acoustically absorbent material to acoustic energy passing thereby.

References Cited in the file of this patent

UNITED STATES PATENTS

| | | |
|---|---|---|
| 859,488 | Dolmetsch | July 9, 1907 |
| 1,660,745 | Delaney | Feb. 28, 1928 |
| 1,770,767 | Collings et al. | July 15, 1930 |
| 1,900,522 | Sabine | Mar. 7, 1933 |
| 1,952,975 | Davy | Mar. 27, 1934 |
| 2,013,695 | Nicolson | Sept. 10, 1935 |
| 2,065,751 | Scheldorf | Dec. 29, 1936 |
| 2,270,825 | Parkinson | Jan. 20, 1942 |
| 2,308,869 | Eckardt | Jan. 19, 1943 |
| 2,519,161 | Tucker | Aug. 15, 1950 |
| 2,528,049 | Gonda | Oct. 31, 1950 |
| 2,542,428 | Peik | Feb. 20, 1951 |